United States Patent
Ashley et al.

(10) Patent No.: US 11,227,241 B2
(45) Date of Patent: *Jan. 18, 2022

(54) SYSTEM AND METHOD FOR ASSIGNING EMPLOYEES TO CASH REGISTERS

(71) Applicant: Walmart Apollo, LLC, Bentonville, AR (US)

(72) Inventors: Allen Ashley, Bentonville, AR (US); Anthony William Helms, Bentonville, AR (US); Kevin Hayes, Bentonville, AR (US); Johan Christophe Baer, Centerton, AR (US); Derric D'souza, Bentonville, AR (US); Joshua David Osmon, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 592 days.

This patent is subject to a terminal disclaimer.

(21) Appl. No.: 15/903,625

(22) Filed: Feb. 23, 2018

(65) Prior Publication Data
US 2018/0189711 A1    Jul. 5, 2018

Related U.S. Application Data

(62) Division of application No. 13/748,991, filed on Jan. 24, 2013, now Pat. No. 9,928,471.

(51) Int. Cl.
*G06Q 10/06* (2012.01)
*G07G 1/00* (2006.01)
*G07G 1/12* (2006.01)

(52) U.S. Cl.
CPC ..... *G06Q 10/063112* (2013.01); *G06Q 10/06* (2013.01); *G06Q 10/0631* (2013.01);
(Continued)

(58) Field of Classification Search
CPC combination set(s) only.
See application file for complete search history.

(56) References Cited

U.S. PATENT DOCUMENTS

| 5,111,391 A | 5/1992 | Fields et al. |
| 5,390,107 A * | 2/1995 | Nelson ............. G06Q 10/06311 |
| | | 705/7.13 |

(Continued)

FOREIGN PATENT DOCUMENTS

| JP | 2002-024350 A | 1/2002 |
| JP | 2002-024947 A | 1/2002 |

(Continued)

OTHER PUBLICATIONS

V. L. Shatz, "Computer networks for retail stores," in Computer, vol. 6, No. 4, pp. 21-25, Apr. 1973, doi: 10.1109/MC.1973.6535800. (Year: 1973) (Year: 1973).*

(Continued)

*Primary Examiner* — Crystol Stewart
(74) *Attorney, Agent, or Firm* — Fitch, Even, Tabin & Flannery LLP

(57) ABSTRACT

A method and system for automatically assigning employees to work plurality of cash registers when the employees report for work is described. The system and method automatically compares the employee's qualifications to the current operational status of a plurality of cash registers and any parameters that may govern the operation of the cash registers such as age requirements for the sale of alcohol. The system automatically assigns an employee to a cash register and transmits real time operational status of those cash registers to a supervisor via a wireless device.

20 Claims, 3 Drawing Sheets

(52) U.S. Cl.
CPC ... *G06Q 10/0633* (2013.01); *G06Q 10/06311* (2013.01); *G06Q 10/06315* (2013.01); *G06Q 10/063116* (2013.01); *G07G 1/0036* (2013.01); *G07G 1/00* (2013.01); *G07G 1/12* (2013.01)

(56) References Cited

U.S. PATENT DOCUMENTS

| | | | |
|---|---|---|---|
| 5,459,657 A * | 10/1995 | Wynn | G06Q 10/109 |
| | | | 705/32 |
| 5,557,513 A * | 9/1996 | Frey | G06Q 10/0631 |
| | | | 705/7.12 |
| 6,049,776 A | 4/2000 | Donnelly et al. | |
| 6,823,315 B1 * | 11/2004 | Bucci | G06Q 10/06 |
| | | | 705/7.16 |
| 6,912,507 B1 | 6/2005 | Phillips et al. | |
| 7,146,304 B1 | 12/2006 | Cash et al. | |
| 7,222,082 B1 | 5/2007 | Adhikari et al. | |
| 7,792,256 B1 | 9/2010 | Arledge et al. | |
| 8,386,639 B1 | 2/2013 | Galvin | |
| 8,452,630 B1 | 5/2013 | Fisher et al. | |
| 8,788,308 B1 | 7/2014 | Cox et al. | |
| 9,579,048 B2 | 2/2017 | Rayner et al. | |
| 9,928,471 B2 | 3/2018 | Ashley | |
| 2002/0040313 A1 * | 4/2002 | Hunter | G06Q 10/06 |
| | | | 705/7.13 |
| 2002/0052770 A1 | 5/2002 | Podrazhansky | |
| 2002/0178048 A1 * | 11/2002 | Huffman | G06Q 10/06311 |
| | | | 705/7.13 |
| 2003/0135406 A1 | 7/2003 | Rowe | |
| 2004/0093351 A1 | 5/2004 | Lee et al. | |
| 2004/0267591 A1 | 12/2004 | Hedlund et al. | |
| 2005/0027651 A1 | 2/2005 | DeVault | |
| 2005/0080658 A1 * | 4/2005 | Kohn | G06Q 10/04 |
| | | | 705/7.14 |
| 2006/0155630 A1 | 7/2006 | Sonnleithner et al. | |
| 2007/0021999 A1 | 1/2007 | Whalen et al. | |
| 2007/0100677 A1 * | 5/2007 | Boss | G06Q 10/06 |
| | | | 705/7.13 |
| 2007/0192173 A1 | 8/2007 | Moughler et al. | |
| 2007/0282659 A1 | 12/2007 | Bailey et al. | |
| 2008/0208696 A1 * | 8/2008 | Olson | G06Q 30/06 |
| | | | 705/16 |
| 2008/0255919 A1 | 10/2008 | Gorder | |
| 2008/0290182 A1 * | 11/2008 | Bell | G06Q 30/0202 |
| | | | 235/61 V |
| 2009/0276280 A1 * | 11/2009 | Whitsitt | G06Q 10/06 |
| | | | 705/16 |
| 2009/0276715 A1 | 11/2009 | Arbogast et al. | |
| 2010/0257013 A1 * | 10/2010 | Beauregard | G06Q 10/02 |
| | | | 705/7.13 |
| 2010/0268564 A1 | 10/2010 | Holliday | |
| 2010/0312606 A1 | 12/2010 | Gala | |
| 2011/0161128 A1 | 6/2011 | Barney et al. | |
| 2011/0231331 A1 | 9/2011 | Smith | |
| 2012/0029962 A1 | 2/2012 | Podgurny et al. | |
| 2012/0078388 A1 * | 3/2012 | Collins | G06Q 10/06 |
| | | | 700/19 |
| 2013/0282420 A1 * | 10/2013 | Paul | G06Q 10/06 |
| | | | 705/7.16 |
| 2013/0339083 A1 * | 12/2013 | Baier | G06Q 30/02 |
| | | | 705/7.29 |
| 2014/0081738 A1 * | 3/2014 | Abraham | G06Q 30/0238 |
| | | | 705/14.38 |
| 2015/0012323 A1 | 1/2015 | Guerinik et al. | |
| 2016/0034981 A1 * | 2/2016 | Kluver | G06Q 30/0633 |
| | | | 705/21 |
| 2016/0342929 A1 | 11/2016 | Tanaka et al. | |

FOREIGN PATENT DOCUMENTS

| | | |
|---|---|---|
| JP | 2002024350 | 1/2002 |
| JP | 2002024947 | 1/2002 |
| JP | 2003-317154 A | 11/2003 |
| JP | 2003317154 | 11/2003 |
| JP | 4333984 | 9/2009 |
| JP | 4333984 B2 | 9/2009 |
| WO | 2013/006644 A1 | 1/2013 |

OTHER PUBLICATIONS

Examination Report from related Great Britian patent application No. GB1513504.9 dated Jul. 23, 2019.
Office Action from related Canadian patent application No. 2,899,038 dated Jan. 24, 2020.
U.S. Appl. No. 13/748,991; Office Action dated Oct. 8, 2015.
U.S. Appl. No. 13/748,991; Office Action dated Apr. 26, 2016.
U.S. Appl. No. 13/748,991; Office Action dated Mar. 17, 2017.
U.S. Appl. No. 13/748,991; Office Action dated Jun. 23, 2017.
U.S. Appl. No. 13/748,991; Notice of Allowance dated Nov. 14, 2017.
CIPO; App. No. 2,899,038; Office Action dated Oct. 29, 2020.
UKIPO; App. No. GB1513504.9; Office Action dated Jan. 7, 2020.
PCT; App. No. PCT/US2014/012999; International Search Report and Written Opinion dated May 26, 2014.
PCT; App. No. PCT/US2014/012999; International Preliminary Report on Patentability dated Jul. 28, 2015.

* cited by examiner

| | Menu | ⚠ CSM Requests | Exit |
|---|---|---|---|
| Frontend Register Overview | | | 7:00am |

| Registers open vs. plan | ◄ | 6:30a 2 of 2 | 7:00a 6 of 2 | 7:30a 8 of 3 | ► |
|---|---|---|---|---|---|
| 16 | CASHIER 1 | ☐ | End 7:00a | | |
| 5 | CASHIER 2 | ☐ | ☐ | ☐ | |
| 0 | CASHIER 3 | | Start 7:00a | ☐ | |
| | CASHIER 4 | ☐ | End 7:00a | | |
| | CASHIER 5 | | Start 7:00a | ☐ | |
| | CASHIER 6 | | Start 7:00a | ☐ | |

FIG. 3

SYSTEM AND METHOD FOR ASSIGNING EMPLOYEES TO CASH REGISTERS

CROSS-REFERENCE TO RELATED PATENT APPLICATION

This application is a divisional application of U.S. patent application Ser. No. 13/748,991 which was filed Jan. 24, 2013, the content of which is hereby incorporated by reference in its entirety.

BACKGROUND OF THE INVENTION

The present invention relates generally to the automated assignment of tasks to employees in a retail store. More specifically, the invention relates to automatically assigning employees to work at a plurality of cash registers.

In the retail arena and especially in large retail environments, assigning properly trained employees to run cash registers can be a time consuming and inefficient task. For example, a typical "big box" retailer may have a large number of cash registers (e.g., 10-30) located at the front of a store. A typical department store may have a similar number of registers scattered over multiple stories in a mall.

Retailers know that at any given time the operation of some of those registers is a higher priority than others. For example, in "big box" stores customer traffic usually leads to operating those registers on an "outside-in" basis. In other words, the registers at either end of the line of registers are maintained in operation and other registers are added as needed moving from the periphery towards the middle. In multi-level stores some retail areas (women's makeup) may require more cashiers than another area (men's shoes) at any given time. Similarly, department stores may prioritize operation of registers in the interior of the store to encourage customers to walk past additional merchandise on their way to check out.

The supervisors who have responsibility for maintaining optimal operation of the cash registers have a difficult task. They must monitor which employees are at work at any given time; know which employees are trained to operate particular registers (e.g., a single register vs. a bank of self-checkout registers); know which employees are suitable for a particular register (e.g., age limits for alcohol registers); know which registers are mechanically operational; know when employees start their shift and are due breaks; and work around daily scheduling upsets such as late employees, broken equipment or a random large influx of customers.

Currently, some retailers utilize large handwritten or computerized spreadsheets to assign employees to various cash registers or other tasks. A typical scenario, which can be repeated multiple times during the day, would be for a supervisor to receive a "master schedule" showing which employees are scheduled to work various shifts that day. This master schedule may or may not contain employee specific data such as which ones are qualified to operate a cash register. An employee then "clocks-in" to work and approaches an assignment supervisor who oversees the spreadsheet. The assignment supervisor determines if the employee is qualified to operate a cash register, looks at the spreadsheet of cash registers, then assigns the employee to a register and makes note of break times, which employees are ending shifts, which registers need to come out of service for reconciliation, etc.

Manually assigning employees to cash registers is time consuming and requires the attention of at least one employee under normal circumstances. However, numerous events can occur during the day that can significantly complicate matters. For example, if an employee clocks-in late then scheduled break times, end-of-shift times, and register assignments may need to be altered. If a cash register qualified employee calls in sick then another employee must be located to take that employee's place. It is not uncommon for cash register assignment duty to take up a large portion of one employee's time on any given day.

Accordingly, there is a need for an automated method for assigning employees to work a plurality of cash registers in a retail store. Preferably, the method would be computer based and would automatically communicate a cash register assignment to an employee when the employee clocks-in at the beginning of the shift. There is also a need for a computer system that is suitable for conducting such a method.

SUMMARY OF THE INVENTION

In one aspect, the invention includes a method for automatically assigning employees to a plurality of cash registers based upon current availability of employees in a retail store. The method comprises several steps including the steps of providing one or more databases. One such database is a cash register database stored on a computer readable medium wherein the data stored in the cash register database comprises parameters that control the assignment of employees to a plurality of cash registers. Another database is an employee database comprising employee profile data.

The method monitors the operational status of a plurality of cash registers and assigns employees to work the registers via the execution of software encoded on a machine readable storage medium. The execution of software is initiated by an employee and conducted by a computer processing unit that is in communication with the cash register database and the employee database. The software compares the employee's profile data with the current operational status of the plurality of cash registers and automatically assigns the employee to a cash register based upon the employee's profile data and the current operational status of the plurality of cash registers.

Another aspect of the invention is a method for a retail company to automatically assign an employee of the retail company to the task of operating a cash register. The method comprises the step of monitoring the current operational status of a plurality of cash registers and storing data defining the current operational status of the plurality of cash registers in a cash register database in a machine readable form.

The method includes an exchange and comparison of data between a cash register database and an employee database over a data network, wherein the cash register database stores machine readable data comprising parameters that control the assignment of employees to a plurality of cash registers, and wherein the employee database stores machine readable data comprising employee profile data. The exchange and comparison of data is initiated by an employee at the beginning of a work shift and is conducted by a computer processing unit utilizing software encoded on a machine readable storage medium.

The software compares the current operational status of the plurality of cash registers with the parameters that control the assignment of employees to a plurality of cash registers and the profile of employees currently working in the store. The software then assigns the employee that initiated the exchange and comparison of data to a cash register based upon the current operational status of the plurality of cash registers.

The invention also encompasses a system for automatically assigning employees to a plurality of cash registers based upon current availability of employees in a retail store. The system comprises at least one database, and preferably a plurality of databases. Such databases could include a cash register database stored on a computer readable medium wherein the data stored in the database comprises parameters that control the assignment of employees to a plurality of cash registers.

Another possible database utilized in the system is an employee database comprising employee profile data stored on a computer readable medium.

The system includes a portal that provides employees access to the system and a computer processing unit (CPU) that is in electronic communication with the cash register database, the employee database, the portal, and other databases or elements that are part of the system.

Software is encoded on a machine readable storage medium and executed by the CPU. The execution of the software is initiated by an employee logging into the portal. After initiation, the software compares the employee's profile data with the current operational status of the plurality of cash registers, and automatically assigns the employee to a cash register based upon the employee's qualifications and the current operational status of the plurality of cash registers.

BRIEF DESCRIPTION OF THE DRAWINGS

These and other more detailed and specific features of the present invention are more fully disclosed in the following specification, reference being had to the accompanying drawings, in which:

FIG. 3 is a screenshot of one possible graphical user interface for a wireless handheld computer used in the practice of the invention.

DETAILED DESCRIPTION OF THE INVENTION

In the following description, for purposes of explanation, numerous details are set forth to provide an understanding of one or more embodiments of the present invention. Furthermore, the following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

While the invention is described with respect to various embodiments thereof, it will be understood by those skilled in the art that various changes in detail may be made therein without departing from the spirit, scope, and teaching of the invention. Accordingly, the invention herein disclosed is limited only as specified in the claims.

In one aspect, the invention is a method for automatically assigning employees to a plurality of cash registers based upon current availability of employees in a retail store. In one broad aspect the method comprises the steps of (1) providing a cash register database containing data related to available cash register tasks and parameters that control the assignment of employees to those tasks; (2) monitoring the operational status of cash registers; (3) providing an employee database comprising individual employee profile data (e.g., qualifications and training levels); and (4) executing software encoded on a machine readable storage medium to compare the employee's profile data with the current operational status and staffing needs for the cash registers, and automatically assigning the employee to a cash register based upon the employee's profile data and the current operational status of the cash registers.

The following paragraphs will discuss each of these steps in more detail in the context of assigning employees to cash registers. However, it should be understood that the concepts disclosed herein are not limited to the assignment of cash registers and can be applied to the assignment of any number of other tasks.

Figure 1:
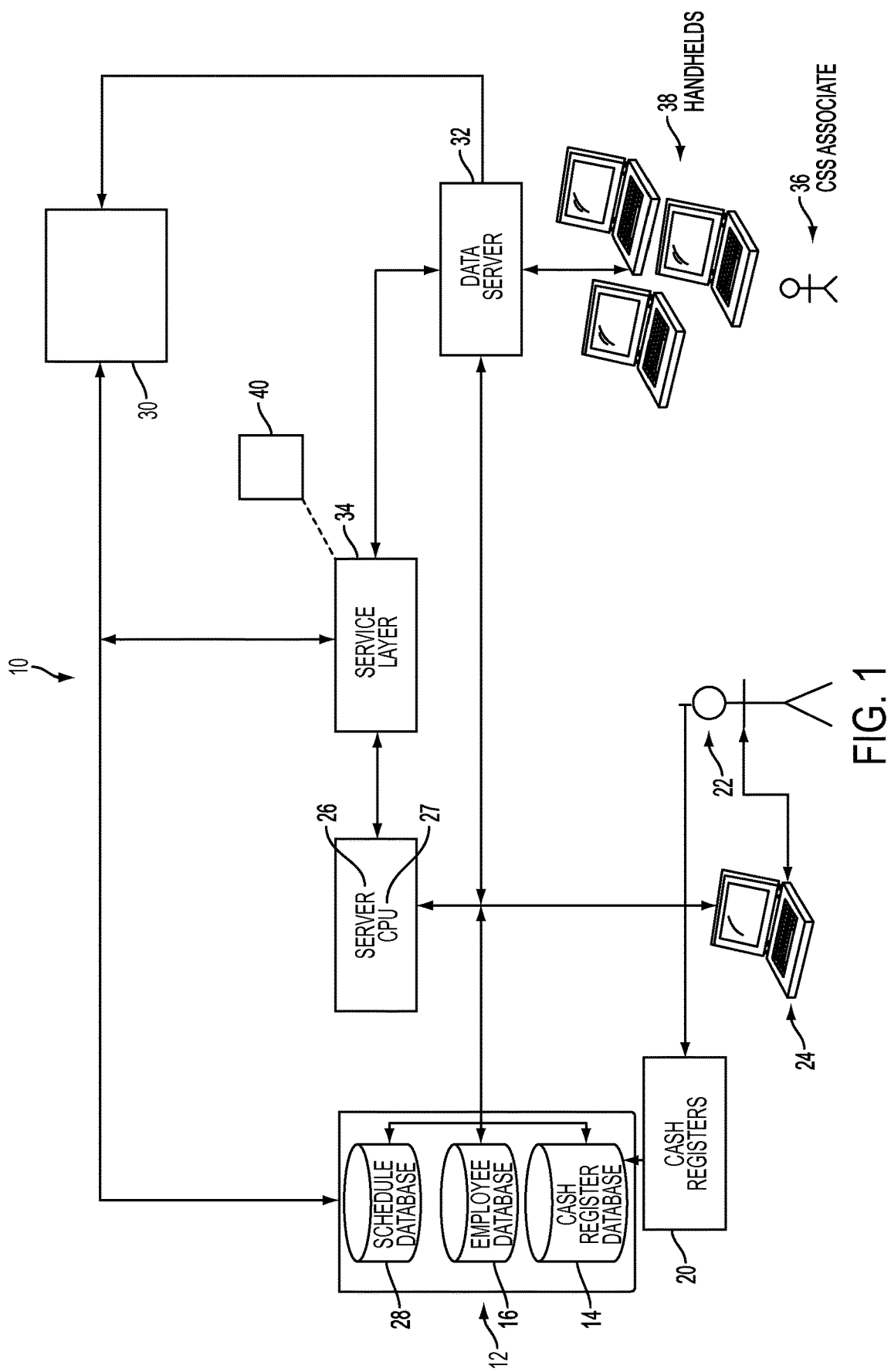
FIG. 1 is an exemplary block diagram of one possible embodiment of the computerized system.

FIG. 1 is a block diagram of an exemplary embodiment of a system for automatically assigning employees to a plurality of cash registers based upon the current availability of employees in a retail store. The system 10 and method comprises and utilizes a plurality of databases, employee access portals, software, and servers to assign an employee to a cash register when that employee initiates the system and method. The details of these elements and how they function together are discussed below in a typical workday scenario. This manner of describing the invention is for narrative convenience and should not be interpreted as limiting the scope of the invention.

FIG. 1 shows a bank of databases 12 containing various types of data. This bank of databases could be one single large database or it could be a plurality of separate databases containing database-specific data. For clarity this detailed description describes the invention as if the system and method utilizes multiple databases containing database-specific data. For example, this discussion references a cash register database 14 that contains data related to a plurality of cash registers and an employee database 16 that contains employee specific data. This narrative convenience and should not be interpreted as limiting the scope of the invention.

The system 10 utilizes a cash register database 14 stored on a computer readable medium wherein the data accessed by the database comprises parameters that control the assignment of employees to a plurality of cash registers, in conjunction with data located on other databases. These parameters that control the assignment of employees to cash registers can vary from store to store. Generally speaking, such parameters include task-centric parameters, strategy-centric parameters, employee-centric parameters and combinations of these.

An exemplary parameter that is both a task-centric and employee-centric parameter is the sale of alcohol. Only employees over a certain age can operate cash registers that sell alcohol The same age restrictions apply to cash registers in sections of stores that sell tobacco.

Specialized training is an example of a task-centric parameter. For example, overseeing a bank of self-checkout registers is often a specialized task that requires specialized training. Another task-centric parameter may be the operation of one specific type of cash register. Another task-centric parameter could be the mechanical status of a register. A non-functioning register is an operational parameter that directly governs which employees are assigned to which register in the plurality of registers.

An example of a strategy-centric parameter is the prioritization of the operation of a plurality of cash registers. One merchant may place higher priority on opening registers on an "outside-in" basis to facilitate movement of customers toward peripherally placed doors. Similarly, other merchants may place a higher priority on certain registers during certain periods to increase customer traffic around specific displays or aisle end-caps.

In summary, there are numerous parameters that in some way control and define a cash register's operational status (e.g., is it operating, who is operating it, etc.). These parameters are stored in system databases such that they can be accessed by a server and CPU and utilized in the process of assigning employees to cash registers. Providing such accessibility can include storing the parameters in a machine readable format in the cash register database 14 or storing the parameters in a separate database that communicates with the cash register database 14 over a data network.

The cash register database 14 is in electronic communication with and receives operational status data from the plurality of cash registers 20 periodically during the day, usually on a continual real-time basis. Such operational status data includes whether or not the cash register is online or functional, the identity of the employee 22 that is currently logged in to operate the register, and the time that the employee 22 logged in to or out of the register, among other data. This data, which defines the current operational status of the plurality of cash registers, is stored in the cash register database 14.

The system 10 further comprises an employee database 16. The employee database 16 comprises employee profile data stored on a computer readable medium. The employee profile data stored on the database 16 includes employee specific data such as whether or not the employee is trained or qualified or available to do a particular task. Such profile data could include the employee's age, training history, overtime status, or any particular constraints on the employee's work assignments (e.g., inability to lift more than 30 pounds). Generally speaking, the profile data indicates whether the employee is qualified to perform the various tasks stored in the cash register database 14.

In FIG. 1, the horizontal dotted line represents a separation between the local or store-specific elements of the system 10 and a centralized computer system 30 such as the master servers and databases at a merchant's home office. The system 10 is designed to allow interaction and an exchange of data between a local store and a home or regional office where some centralized activities (e.g., payroll) might take place. The optional inclusion and function of a scheduling database 28 in the system 10 illustrates such a local/distant exchange of data that can bring additional efficiencies to the system.

In some multi-location retail operations certain tasks are performed at a centralized location such as a home office. Accounting, human resources, general work schedules, vacation scheduling, etc., might all be centralized into one or more servers or databases at the home office. In this example, the home office databases 30 send data to the local databases 12 and receive data from those databases and the overall system.

An example of data transfer from a remote home office database or server to a local store might be the transfer of a master schedule that contains a list of employees that are scheduled to work on particular days during a particular week. Such a schedule might provide basic information regarding which employees are scheduled for a specific shift in a specific department. For example, a master schedule may have John Doe arriving for the 10-6 shift and assigned to be a cashier.

However, a master schedule is only a proposed plan and local events can completely change a work schedule. An employee may call in sick or arrive late for a shift. The system 10 is designed to respond to such variables and automatically adjust schedules and assignments and transmit those changes to a distant server or database (i.e., a home office database) if necessary. Accordingly, the system provides for the electronic communication between the distant databases (i.e., home office database 30) and the local databases 12. This aspect of the invention is discussed in more detail in section describing the method according to the invention.

The system 10 includes a portal 24 that provides employees 22 access to the system. In FIG. 1 the portal 24 is shown as a standard keyboard controlled computer. Such computers typically present employees with a graphical user interface (GUI) that provides the ability to "clock in" for a shift upon entering a user name and password. Such GUIs are known in the art and several are available as off-the-shelf commercial time tracking software packages.

Although the portal 24 is represented as a typical keyboard controlled computer in FIG. 1, other types of portals may be utilized in the practice of the invention. In one preferred embodiment, the system of the invention utilizes existing price-check barcode scanners that are typically found throughout "big box" retail stores. Such scanners typically have a barcode or RFID reader and a screen. When a shopper scans a product the scanner provides information about the product to the shopper. These types of scanners can also be used as time clocks for employees.

In this embodiment of the system, an employee 22 arrives at work, approaches a scanner, and scans an identification badge or similar object that has a readable and unique identifier (e.g., a barcode) that is assigned to that employee. The scanner registers the employee as arriving to begin a work shift, transmits that data for storage in the appropriate database (e.g., the employee database 16) and initiates the cash register assignment system. The system then assigns the employee to a cash register based on the current operational status of the cash registers and communicates that assignment via a message that appears on the scanner's screen.

The system according to the invention can be configured to utilize other types of portals 24 such as smartphones, tablet computers, or a telephone based interactive voice system.

The system 10 includes a server 26. The server 26 is a computing platform that includes a processing entity such as a CPU 27 that executes software and provides the core system functionality of assigning tasks to employees, and enabling the employees and managers to access and interact with information for facilitating tasks associated with the management of employee resources. The server 26 and its CPU 27 are in electronic communication with all of the previously described databases (e.g., the cash register database, the employee database) and the portal 24 via a data network. The CPU 26 also communicates with a local data server 32 and a service layer 34, both of which are discussed in more detail below.

The software utilized by the system is encoded on a machine readable storage medium in the server 26. The software is executed by the CPU 27. The execution of the software is initiated by an employee 22 logging into a portal

Figure 2:
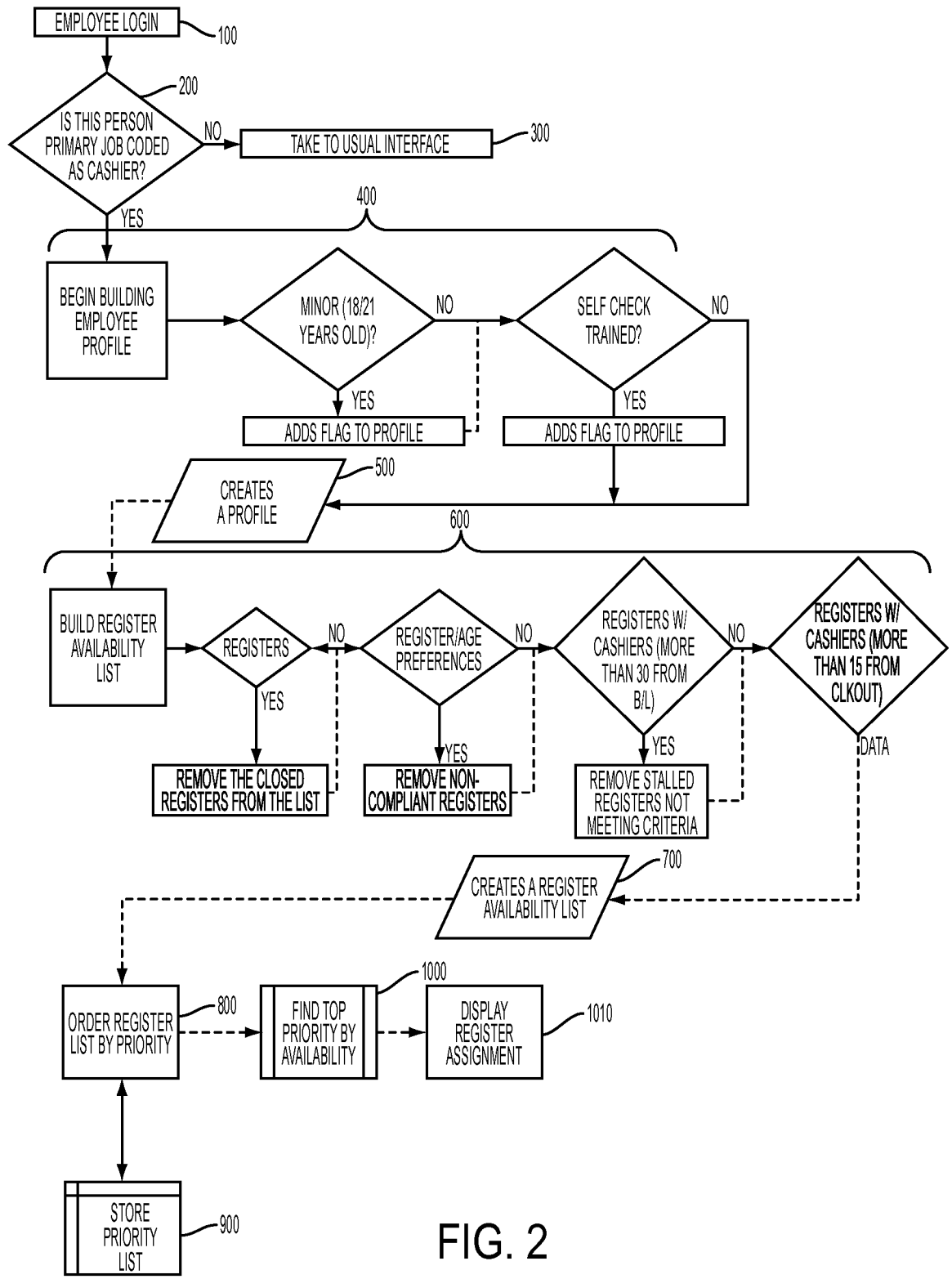
FIG. 2 is an exemplary flow diagram illustrating one possible embodiment of software that can be utilized in the practice of the invention.

24 as discussed previously. FIG. 2 provides an exemplary flow diagram of software that can be utilized in the practice of the invention. The execution of the software is discussed in more detail in the section describing the method according to the invention.

One of the benefits of the system 10 is that it provides local supervisors 36 with current, "real-time" information regarding the operational status of the plurality of registers 20 and the availability and status of cash register qualified employees. This benefit is accomplished through a wireless data server network 32 that is electronically connected to the server/CPU (26,27) and to a plurality of handheld wireless devices 38 carried by the supervisors.

In large retail environments supervisors must be on the retail floor moving from place to place to accomplish various tasks. Many retailers issue handheld, wireless computers to their supervisors to aid them in their tasks. Such wireless computers are widely used in the art. Commercially available wireless computers such as the Motorola MC-series (MC55, MC65) are exemplary of the types of wireless, mobile computers that can be used in the practice of the invention.

As shown in FIG. 1, the handheld wireless devices 38 are connected to the bank of databases 12 via the server/CPU and a wireless communication system comprising the wireless data server network 32. Through these wireless devices supervisors have direct access to the data contained in the database bank 12 and the current, real time operational status of the plurality of cash registers that they supervise. FIG. 3 is an exemplary GUI illustrating the types of data that are available to a supervisor via the handheld device. The GUI shown in FIG. 3 provides a supervisor with a list of cash register qualified employees and their current operational status (e.g., are they clocked in, which register have they logged onto, etc.).

An optional but preferred element of the system according to the invention is a service layer 34 shown in FIG. 1. The term service layer, as used herein, represents a secure but user friendly interface that allows data viewing by extra-system data networks 40 that might need to view data in the system. The connection of such extra-system data networks 40 is illustrated by a dotted line in FIG. 1.

For example, a retailer's human health department may need data related to repetitive motion injuries sustained by cashiers. Third party vendors (e.g., human resource consultants) might need data related to shift changes. The service layer 34 allows these disparate users to view data collected by the system 10.

Turning now to the method according to the invention, in simple terms the method utilizes the components of the previously described system in the manner in which they are intended. For example, the invention includes a method for automatically assigning employees to a plurality of cash registers based upon current availability of employees in a retail store.

The method comprises the step of providing a cash register database 14. The data in the database is stored on a computer readable medium and comprises parameters (such as those discussed previously) that control the assignment of employees to a plurality of cash registers.

The method also monitors the current, "real time" operational status of a plurality of cash registers 20 and stores data defining that status in a database in a machine readable form that is accessible by other components of the system 10. In the exemplary system 10 such data is stored in the cash register database 14.

The method continues by providing an employee database 16 comprising employee profile data such as the profile data discussed previously.

Software accesses the previously mentioned databases to gather and exchange data between and among the various components of the system via the previously described data network. The software compares the employee's profile data with the current operational status of the plurality of cash registers and the parameters that control the assignment of employees to the plurality of cash registers then automatically assigns the employee to a cash register based upon the employee's qualifications and the current operational status of the plurality of cash register.

FIG. 2 is an exemplary flow diagram illustrating sample logic employed by software suitable for practicing the invention. The flow diagram begins with Step 100 in which the employee 22 clocks in at work at a portal 24 as described previously. For purposes of this discussion it is assumed the employee clocks in at work by swiping an ID badge at a scanner that has a computer screen attached to it for displaying information to the employee.

The first decision, Step 200, taken by the software is to determine whether or not the employee's primary job code identifies the employee as being a cashier. The data necessary for making this determination can be encoded as part of the employee's ID badge or the data can be pulled from the employee database 16. If the employee is not coded as being a cashier the portal 24 provides other information to the employee, Step 300.

If the employee 22 is identified as a being a cashier, the software begins the process of assigning the employee to a cash register. Step 400 represents the assembly of employee profile data that is contained in the employee database 16. For example, is the employee a minor for purposes of selling alcohol or tobacco? Is the employee qualified to operate a bank of self-checkout registers. This data is collected to create an employee profile, Step 500.

The employee profile is matched against a list of available registers and any specific parameters that control the operation of those registers. The list of available registers is compiled in a series of data gathering steps collectively identified as Step 600 in FIG. 2.

The data necessary to compile the list of available registers can be pulled from any of the previously discussed databases. For example, each of the individual cash registers generates data regarding its current, real time operational status (e.g., who is operating the register, is the register functioning). In FIG. 1 that data is stored in the cash register database 14. Other register specific data can be stored in the cash register database 14 as well. Such data could include whether or not an available register is age limited (e.g., does it sell alcohol or tobacco). These parameters are compared to the employee profile with the result being that the software may remove some registers from the list of available registers. For example, if the employee is 18 any registers handling the purchase of alcohol are removed from the list.

The scheduling and employee databases (28, 16) are also utilized in compiling a list of available registers in Step 600. For example, the software may check the scheduling database to identify if there are registers with employees that are due to go to lunch or to break or to clock out within 15 minutes. In addition, the software may check the scheduling and employee databases (28, 16) to identify those registers that are operated by employees that are more than 30 minutes from leaving a shift or taking a break. The assimilation of data in Step 600 culminates in the creation of a list of available registers in Step 700.

The software then compares the list of available registers with a prioritized ranking of cash registers to develop a prioritized list of available registers in Step 800. The prioritization process compares the data gathered in creating the employee profile (Step 500) with the data gathered in creating the list of available registers (Step 700). This data is also compared with a prioritized ranking that may be global or local in scope. For example, the merchant may have a company-wide policy to give highest operational priority to cash registers at either end of a bank of registers. This company wide prioritization parameter is then compared to local prioritization parameters represented by Step 900. For example, a local store may place a high priority on a register near a particular display to drive customer traffic to the display.

The data and other operational parameters are then combined to create a prioritized list of the plurality of cash registers. The employee is then assigned to the top prioritized cash register that the employee is qualified to operate, Step 1000. The assignment is presented to the employee via a graphical user interface at the portal 24, Step. 1010. The employee then proceeds to the assigned cash register to report for duty.

When the employee logs into the assigned cash register that event is captured and stored by the cash register database 14 which then uses that data to update the current, real-time operational status of the plurality of cash registers 20. This event may also be stored in other databases such as the employee database 16 and the scheduling database 28 to capture data needed for compensation and future scheduling purposes.

The data captured and stored by the system, particularly the current operational status of the plurality of registers and the current status of employees, is electronically transmitted to supervisors via a wireless data link which is in communication with a portable electronic computer carried by the supervisor.

The supervisors can then access the data created and captured by the system to make any needed changes to employee cash register assignments based upon the current operational status of the plurality of registers. For example, if an employee working a highly prioritized register needs to leave before the end his/her shift the supervisor only need look at the GUI on the portable electronic computer to determine who else is in the store that is qualified to operate the register rather than returning to a specific location and manually look at a list of available cashiers.

In the drawings and specification, there have been disclosed typical embodiments on the invention and, although specific terms have been employed, they have been used in a generic and descriptive sense only and not for purposes of limitation, the scope of the invention being set forth in the following claims.

We claim:

1. A system to automatically assign an employee to a task of operating a cash register, the system comprising:
   a plurality of cash registers disposed at a facility;
   a plurality of databases;
   a central computing system;
   a plurality of handheld devices;
   a barcode scanner, configured to acquire employee identification information from an identification badge of a first employee of one or more employees associated with the facility;
   a server associated with the facility, including a processor, a service layer and a data server, in communication with the plurality of databases, the plurality of cash registers, the central computing system, the plurality of handheld devices, and the barcode scanner, the server configured to:
   receive from the plurality of cash registers a current real-time operational status of the plurality of cash registers, wherein the operational status includes data associated with the functionality of the plurality of cash registers;
   build a list of available cash registers of the plurality of cash registers in response to receiving the current real-time operational status of the plurality of cash registers;
   remove a subset of cash registers from the list of available cash registers in response to determining the cash registers in the subset of cash registers are not functional based on the received data associated with the functionality of the plurality of cash registers;
   receive from the central computing system, a master schedule associated with the one or more employees;
   store data defining the current operational status of the plurality of cash registers in a first database of the plurality of databases, in a machine readable form;
   receive the employee identification information from the barcode scanner;
   in response to receiving the employee identification information from the barcode scanner, retrieve the data defining the current operational status of the plurality of cash registers and machine readable data comprising parameters that control assignment of employees to the plurality of cash registers from the first database;
   in response to receiving the employee identification information from the barcode scanner, retrieve machine readable employee data comprising employee profile data from a second database of the plurality of databases, wherein the second database stores machine readable data comprising employee profile data;
   compare the current operational status of the plurality of cash registers with the parameters that control the assignment of the employees to the plurality of cash registers and the employee profile data of employees currently working in the facility;
   assign the first employee identified by the employee identification information acquired from the identification badge to one of the one or more of the plurality of cash registers located in the facility based upon the current operational status of the one or more of the plurality of cash registers, and the master schedule;
   receive an event associated with the first employee;
   dynamically adjust the master schedule in response to receiving the event associated with the first employee;
   change the assignment of the first employee to the one of the one or more of the plurality of cash registers to a second employee from the one or more employees in response to adjusting the master schedule;
   transmit the master schedule and change in assignment to central computing system for storing in a second database;
   electronically provide the current real-time operational status of the plurality of cash registers to a first handheld device of the plurality of handheld devices associated with a supervisor of the first employee and the second employee;
   electronically provide a current operational status of each of the one or more employees that are currently working in the facility to the first handheld device associated with supervisor of the first and second employee;

electronically collect, via the service layer, a quantity of data based on assigning the second employee to the one of the one or more plurality of cash registers located in the facility; and electronically provide, via the service layer, access to the quantity of data by at least one third party system.

2. The system of claim 1, wherein the one of the plurality of cash registers assigned to the second employee is associated with a lower priority in a prioritized ranking of cash registers than a highest priority one of the plurality of cash registers located in the facility.

3. The system of claim 2, wherein the first employee is assigned to the one of the plurality of cash registers having the lower priority in response to a determination that the first employee does not satisfy at least one of the parameters that control assignment of employees to the plurality of cash registers associated with the highest priority one of the plurality of cash registers.

4. The system claim 1, wherein said employee profile data comprises employee age and employee training level.

5. The system claim 1, wherein the server, via the service layer, is configured to enable viewing of the quantity of data by an extra-system data network.

6. The system of claim 1, wherein the server is configured to provide real-time information associated with the operational status of the plurality of cash registers and the one or more employees associated with the facility, to the first handheld device associated with the supervisor.

7. The system of claim 1, wherein the first handheld device associated with the supervisor renders a graphical user interface (GUI).

8. The system of claim 7, wherein the GUI presents a list of the one or more employees qualified to operate the cash registers from the list of available cash registers.

9. A system for automatically assigning employees to a plurality of cash registers based upon current availability of employees, the system comprising:
 a cash register database stored on a computer readable medium wherein the data stored in said database comprises:
  parameters that control the assignment of employees to a plurality of cash registers, and
  a list of available cash registers including the plurality of cash registers and real-time operational status of the plurality of cash registers;
 an employee database comprising employee profile data stored on a computer readable medium;
 a portal for employee access to the system;
 a computer processing unit (CPU): That is in electronic communication with the cash register database, the employee database, and the portal;
 software encoded on a machine readable storage medium and executed by said CPU, wherein:

the employee profile data is received in response to receiving employee identification information from a barcode scanner, execution of said software is initiated by an employee logging into said portal, and said software compares the employee's profile data with the operational status of the plurality of cash registers, qualifications of the employee accessed from a respective employee profile data stored in the employee database, and the parameters comprising prioritization of the plurality of cash registers based on customer traffic, and automatically assigns the employee to a cash register of the plurality of cash registers based upon the qualifications of the employee, the operational status of the plurality of cash registers, the parameters comprising prioritization of registers based on customer traffic, and the plurality of cash registers.

10. The system of claim 9, wherein said cash register database is in electronic communication with said plurality of cash registers and stores data defining the operational status of the plurality of cash registers.

11. The system of claim 9, wherein said parameters that control the assignment of employees to cash registers comprise a prioritized ranking of the plurality of cash registers.

12. The system of claim 9, wherein said employee profile data comprises employee age and employee training level.

13. The system of claim 10, further comprising a wireless communication system configured to provide to a supervisor the operational status of the plurality of cash registers.

14. The system of claim 13, wherein said wireless communication system is configured to provide to the supervisor the operational status of each employee that is working in a facility.

15. The system of claim 14, wherein the wireless communication system is configured to render a graphical user interface (GUI).

16. The system of claim 15, wherein the GUI presents a list of employees qualified to operate each of the plurality of cash registers.

17. The system of claim 9, further comprising a wireless communication system configured to provide communicate the operational status of the plurality of cash registers.

18. The system of claim 9, wherein said wireless communication system is configured to provide to the operational status of employees that are working in a facility.

19. The system of claim 9, wherein the wireless communication system is configured to cause a graphical user interface (GUI) to be displayed.

20. The system of claim 19, wherein the GUI presents a list of employees qualified to operate each of the plurality of cash registers.

* * * * *

UNITED STATES PATENT AND TRADEMARK OFFICE
CERTIFICATE OF CORRECTION

PATENT NO. : 11,227,241 B2
APPLICATION NO. : 15/903625
DATED : January 18, 2022
INVENTOR(S) : Allen Ashley et al.

Page 1 of 1

It is certified that error appears in the above-identified patent and that said Letters Patent is hereby corrected as shown below:

In the Claims

In Claim 4, at Column 11, Line 19 after "system" insert --of--.

In Claim 5, at Column 11, Line 21 after "system" insert --of--.

In Claim 9, at Column 11, Line 49 delete ": That" and replace with --that--.

Signed and Sealed this
Twenty-sixth Day of September, 2023

Katherine Kelly Vidal
*Director of the United States Patent and Trademark Office*